H. T. LAUTERBACH.
DISK COLTER.
APPLICATION FILED OCT. 17, 1912.
1,087,790.
Patented Feb. 17, 1914.
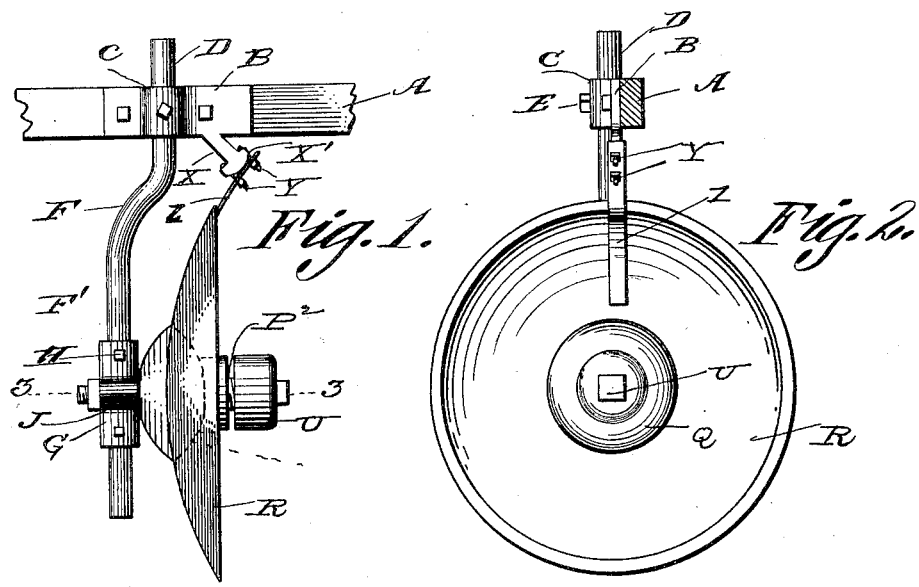
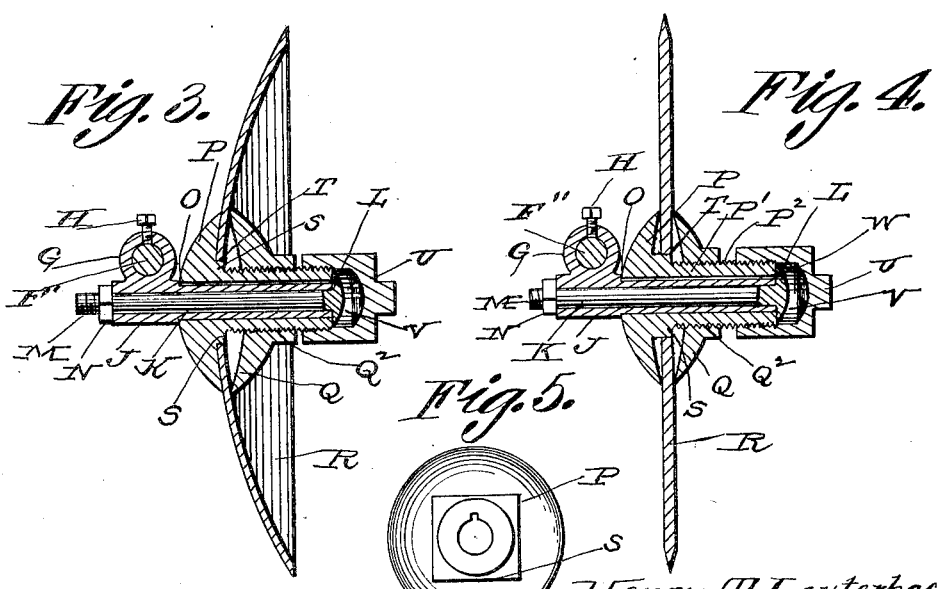

UNITED STATES PATENT OFFICE.

HENRY T. LAUTERBACH, OF EARLVILLE, ILLINOIS.

DISK COLTER.

1,087,790.  Specification of Letters Patent.  Patented Feb. 17, 1914.

Application filed October 17, 1912. Serial No. 726,216.

*To all whom it may concern:*

Be it known that I, HENRY T. LAUTERBACH, a citizen of the United States, residing at Earlville, in the county of La Salle and State of Illinois, have invented certain new and useful Improvements in Disk Colters, of which the following is a specification.

My invention relates to improvements in disk colters, and the objects of the invention are to provide a disk colter capable of instant adjustment to various angles or positions according to the character of work desired; which will have means for cleaning or scraping the accumulation from the disk; and which scraping mechanism can be adjusted to operate effectively upon the disk in its various adjustments; which will comprise the fewest possible number of parts to insure simplicity, durability, and inexpensiveness of construction; which will insure the proper lubrication of the parts of the colter; which will permit of ready assemblage and disconnection of its parts; and which in general from every view point will be thoroughly efficient and practical for the purposes intended.

With these objects in view, my invention consists of a disk colter embodying novel features of construction and combination of parts, substantially as disclosed herein.

Figure 1 is an edge view or elevation of a disk colter constructed in accordance with and embodying my invention with a sufficient portion of the plow or agricultural implement frame shown to demonstrate the connection of the colter with the implement. Fig. 2 is a front elevation looking toward the dished portion or face of the disk. Fig. 3 is a sectional view taken on the line 3—3 of Fig. 1. Fig. 4 is a sectional view of a modified construction of my disk colter in which a flat disk is employed, and Fig. 5 is a face view of the bearing disk showing the squared shoulder formed on said disk, which engages a recess in the colter and secures the colter disk and bearing disk in an interlocking connection.

In the drawings: The letter A designates a sufficient portion of the frame of an agricultural implement, upon which is secured the clamping plate or bracket B, formed with a sleeve C in which fits the colter hanger D, said hanger being adjustable in the sleeve and being retained in said adjustment by means of the binding screw E.

This hanger is of peculiar shape, consisting of the upper vertically disposed arm bent or deflected at F and terminating in the long disk carrying arm F'.

From this construction, it will be observed that the hanger is capable of a vertical adjustment with reference to the frame of the implement, as well as a rotary adjustment, and is secured in the desired adjustment with reference to the frame by means of the binding screw, and upon the lower portion of the hanger fits the collar or encircling band G, said band being vertically adjustable upon the hanger, as well as having a rotary adjustment on said hanger, and is retained in the desired adjustment by means of the pair of binding screws H. This band or collar is formed with a tubular hub J, which is disposed at right angles to the band or collar, and in this tubular hub is mounted the clamping rod or bolt K, having upon one end a flat enlarged head L to prevent end motion of the parts of the disk bearing and their slipping off of the rod K. The exposed end of the rod K is threaded at M to receive a clamping nut N.

From this construction, it will be observed that the band or collar is adjustable vertically and rotatably or at angles to the hanger, and that the band or collar is formed with the tubular hub extending at a right angle to said band or collar, and upon this hub and abutting against shoulders O thereon, is the clamping head or disk P, which is formed with the tubular stem P' extending inward, and fitting rotatably upon the hub, and this tubular stem is provided with exterior threads $P^2$, upon which is received the clamping head or disk Q, formed with threads $Q^2$, to engage the screw threads of the tubular stem, and between the two clamping heads or disks is secured the colter disk R, which may be curved or straight as found necessary and desirable, and to make a locking engagement between the clamping disk P and the colter disk R, I provide the disk P with a squared shoulder S, which engages a squared opening T in the disk colter, and thus retains the disk in proper position. It will thus be observed that the disk is adjustable with reference to the hanger, and that it is rotatably mounted upon the tubular hub, and also that the threaded stem on the clamping head projects beyond the other clamping head or disk, and upon this extended threaded end I place the threaded cap U, which thus provides a chamber V to receive a lubricant, an oil feeding passage W being formed in the tubular hub to insure proper lubrication and permit a smooth and easy turning of the disk colter upon the hub.

I form integral with or attach to the clamping bracket for the hanger the scraper supporting arm X, which is formed with the curved head X' against which is adapted to be adjusted by means of the binding screws Y, the flat scraper Z, this connection and construction permitting the scraper to be adjusted to conform to the adjustment of the colter disk to bring the scraper at all times against the face of the disk to effect the proper cleaning or removal of foreign matter from the disk.

It is evident that I provide a disk colter which can be adjusted to any and all of the positions required, which comprises few parts, which can be easily assembled and taken apart, when necessary, and which will fulfil every requirement demanded in an implement of this character.

It will also be observed that the shoulder S of disk P engaging the squared opening of the colter disk R prevents the disk R from creeping, which creeping loosens the clamping nut and threaded flange, and the disk R is by this means securely and reliably clamped between the two clamping disks P and Q.

I claim:—

In a disk colter, the combination with the frame, the clamping bracket having a rounded face, the scraper having its upper end fitting against said rounded face of the bracket-fastenings for adjustably connecting the upper end of the scraper upon the rounded face of the bracket, a hanger mounted in the frame adjacent said bracket, a hub adjustably mounted on the hanger, a disk mounted on said hub and adjusted to have its outer face lie adjacent the lower end of the scraper.

In testimony whereof I affix my signature in presence of two witnesses.

HENRY T. LAUTERBACH.

Witnesses:
NICHOLAS LAUTERBACH,
HAROLD YOST.

---

Copies of this patent may be obtained for five cents each, by addressing the "Commissioner of Patents, Washington, D. C."